United States Patent [19]

Pinkerton et al.

[11] Patent Number: 5,018,112

[45] Date of Patent: May 21, 1991

[54] METHOD FOR HYDROCARBON RESERVOIR IDENTIFICATION

[75] Inventors: Roger P. Pinkerton, Katy, Tex.; Beverly Stebens, Ponca City, Okla.

[73] Assignee: Conoco Inc., Ponca City, Okla.

[21] Appl. No.: 527,682

[22] Filed: May 21, 1990

Related U.S. Application Data

[63] Continuation of Ser. No. 102,278, Sep. 28, 1987, abandoned, which is a continuation of Ser. No. 925,523, Oct. 28, 1986, abandoned, which is a continuation of Ser. No. 434,864, Oct. 18, 1982, abandoned.

[51] Int. Cl.$^5$ .............................................. G01V 1/34
[52] U.S. Cl. ....................................... 367/72; 367/70; 367/38
[58] Field of Search ....................... 367/68, 70, 72, 74, 367/38

[56] References Cited

U.S. PATENT DOCUMENTS 3,193,832 7/1965 Heintz ..................................... 367/70
4,210,964 7/1980 Rogers et al. .......................... 367/70
4,241,429 12/1980 Bloomquist et al. .................. 367/63
4,467,461 8/1984 Rice ....................................... 367/70

OTHER PUBLICATIONS

An Introduction to Geophysical Exploration; P. Kearey & M. Brooks, Geoscience Text, vol. 4, pp. 95-96, & 100.
Bone et al., "Seismic Data Analysis with Tine Seiscrop Map Techniques", AAP6 Bulletin, vol. 60/12, Dec. (1976).

Primary Examiner—Ian J. Lobo

[57] ABSTRACT

A method for processing three-dimensional seismic data to define areal boundaries of hydrocarbon reservoirs. 3-D Seismic data for an area having a producing well is examined to establish an attribute critical parameter that specifically relates to the reservoir structure. Having identified a parameter, the 3-D data can then be examined in a selected time window for presence of the critical parameter and X, Y gridding of its relative value. The relative values are then output to visual plot to provide a plan view of reservoir structure.

2 Claims, 4 Drawing Sheets

METHOD FOR HYDROCARBON RESERVOIR IDENTIFICATION

PRIOR RELATED APPLICATIONS

This application is a continuation of Ser. No. 07/102,278 filed Sept. 28, 1989, which is a continuation of Ser. No. 925,523, filed Oct. 28, 1986, now abandoned, which is a continuation of Ser. No. 434,864, filed Oct. 28, 1982, now abandoned.

BACKGROUND OF THE INVENTION

1. Field of the Invention

The invention relates generally to processing of three-dimensional seismic data and, more particularly, but not by way of limitation, it relates to an improved method for color analysis of 3-D seismic data to identify extent and location of oil and gas reservoir structure.

2. Description of the Prior Art

The prior art has seen various types of 3-D seismic surveying schemes with varying forms of data treatment and it is further known to utilize color differentiation to enhance certain types of three-dimensional or two-dimensional seismic data displays. Applicants presently know of no process for identification of particular reservoir seismic attributes which then enable an enlarged reservoir display through treatment and color display of the selected seismic attribute data.

SUMMARY OF THE INVENTION

The present invention relates to an improved method for evaluating seismic data that includes known producing strata for identification of specific attributes which may then be used to examine for similar attributes in adjoining three-dimensional seismic data. Thus, a three-dimensional survey, i.e. plural, parallel survey lines having known spacing relationship, and which include within their 3-D section volume a known producing well and reservoir, is further examined to derive specific seismic attribute data for use as a standard in testing adjacent subterrain data to establish attribute similarities. The present invention is carried out utilizing commercially available computer equipment in conjunction with known forms of video plotter, such equipment being programmed to carry out the method of the present invention.

Therefore, it is an object of the present invention to provide a method for examining three-dimensional seismic data to establish existence and boundaries of reservoirs containing the hydrocarbons.

It is also an object of the present invention to provide a method of producing a color display of a three-dimensional earth sector with color differentiated indication of oil and gas reservoir sub-strata.

Finally, it is an object of the present invention to provide a digital computer implemented digital process for examining existing three-dimensional seismic data in relation to known and established producing hydrocarbon wells within the sector thereby to identify other reservoir volumes or continuation and extent of reservoir volumes.

Other objects and advantages of the invention will be evident from the following detailed description when read in conjunction with the accompanying drawings which illustrate the invention.

DETAILED DESCRIPTION OF THE INVENTION

In general, the present invention provides a data processing technique for examining seismic data in the area of an established well or known hydrocarbon reservoir in order to establish areal boundaries of such sub-surface reservoir as well as to ascertain spacing and location for additional wells in the area. After establishment of a first, successful well drilling at a particular area, the present invention utilizes re-examination of related seismic data, especially three-dimensional seismic data, thereby to further enlarge information about the size and shape of the hydrocarbon reservoir. Information derived is then valuable in placing offset wells with maximum success and reliability, proving to be a great aid in the development of oil and gas fields.

The technique may be divided generally into three steps. First, previous seismic data, e.g. 3-D data, is examined to identify seismic attributes from the reservoir reflection package that can be used thereafter to define a critical parameter for that reservoir. For example, previous data may show that any of pay thickness, stratum porosity, etc. give rise to a critical parameter that is identifiable to distinguish the oil-bearing stratum or reservoir sector. In a given case, which is exemplified throughout this presentation, seismic modeling studies of data in the area of a newly established well showed that the amplitude of the trough of data reflected from the top of the reservoir stratum was related to the amount of pay in the reservoirs.

In the second step then, the seismic data was examined to establish a time window or series of time windows across 3-D seismic data in which the critical parameter would be present relative to the reservoir data. A search of the seismic data within the defined time windows is then carried out for the seismic attribute of interest, in the example here it was examined for critical trough amplitude, and the trough amplitude values of the seismic attribute are saved for each trace. Then, the seismic data is searched to pick highest trough amplitudes within a single defined time window and this amplitude is saved for each trace of the three-dimensional array.

Finally, step three carries out the display of the seismic attribute values relative to one another on a plan view display, i.e. generally in a horizontal plan disposition of X-Y coordinate and the relative X, Y position within the 3-D survey of each attribute is used to generate such a plan view display. The relative values of the attributes are shown by mapping the values to a defined color bar. In a case to be discussed hereinafter, the trough amplitudes were displayed in color differentiation, particularly in scaled Applicon plots with color indicating the value of each trough amplitude relative to the rest of the trough amplitudes.

Figure 1:
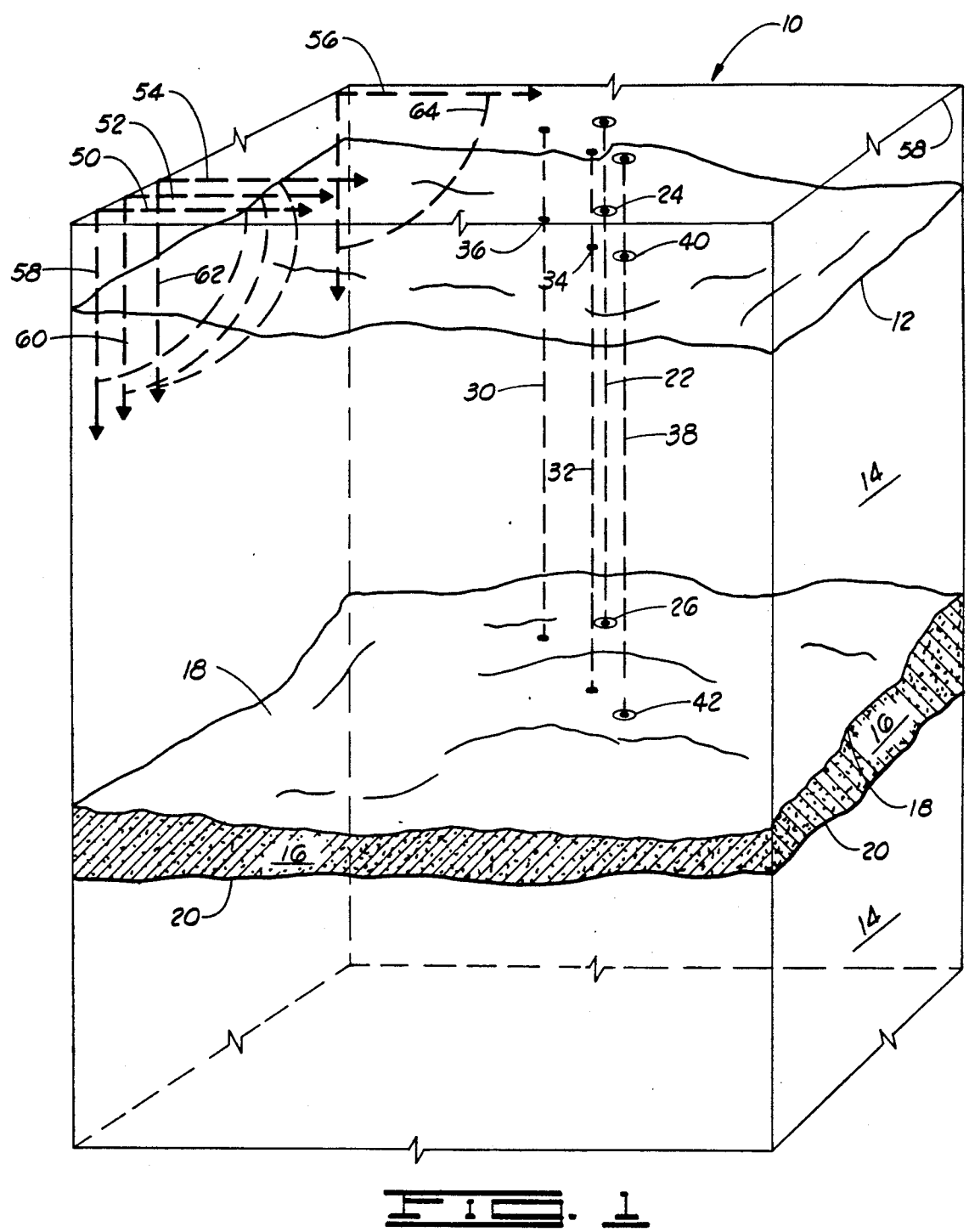
FIG. 1 is an idealized view of a sector of earth surface beneath a water covered area having well bores indicated therein.

FIG. 1 illustrates a water-covered earth area 10 having sea bottom 12 and subterranean earth structure 14 therebelow. For illustration purposes, a particular porous sand stratum 16 having upper interface 18 and lower interface 20 is shown within earth structure 14.

A wild cat or first well 22 has been drilled as from sea bottom bore entry 24 to a successful pay zone or reservoir area 42 within porous stratum 16. Selection of drilling location for well bore 38 would have been made by conventional practices utilizing prior seismic data interpretations or the like. In any event, the well 38 has proven to be a valuable well with probable good reserves of hydrocarbon. Additional offset dry holes 30 and 32 were each drilled after successive data evaluations and well site selections at sea bottom locations 36 and 38, respectively. Utilizing the method of the present invention, a fourth well 22 at sea bottom location 24 was drilled to an up-dip formation of porous stratum 16, as at area 26, and this well also proved to be good pay as previously indicated by color display of attribute data constructed in accordance with the present method. Since the first well development, and not illustrated in FIG. 1, additional successful oil and gas wells have been drilled in the same field depicted in FIG. 1, and such drill sites have been selected in accordance with reservoir attribute evaluation in accordance with the present invention.

In an earth sector of interest, such as earth sector 10 of FIG. 1, 3-D seismic energy data may be available or it may be specifically obtained for the purpose of evaluating the sector. Thus, and referring to sector 10, a plurality of spatially related seismic sections would be run along a plurality of parallel survey lines 50, 52, 54 . . . 56 which extend across the surface of earth sector 10 to a selected termination point or boundary such as line 58. In the case of earth sector 10, the seismic surveys would be run by linear marine sounding traverses as a line of successive source generations and signal receptions along each survey line is effected. After pre-processing, dynamic correction, normalization, stacking or whatever the selected procedures, the seismic data along each survey line would be established as a seismic section, probably of common depth point aligned data. Further processing with observance to the spacing between survey lines 50, 52, 54, etc., then enables cross relationship of the data into a three-dimensional data set.

In performing the present method, the 3-D data set representing in substance the matter as shown generally in FIG. 1, would be considered to determine a critical parameter exhibiting a hybrid seismic response for that data around reservoir area 26, the known hydrocarbon producer and the original well drilled in the sector 10. There are various seismic data processing methods and treatments which may be utilized by the geophysicist to isolate the desirable critical parameter and it will probably result that the operator will actually have a choice of critical parameters for use, and for proving result with balance of one critical parameter against the other. In the subject case, as previously mentioned, a very clear cut critical parameter was indicated by the maximum amplitudes of the data trough as reflected from the top of the reservoir stratum as this was directly related to the amount of pay in the reservoir structure.

Figure 2:
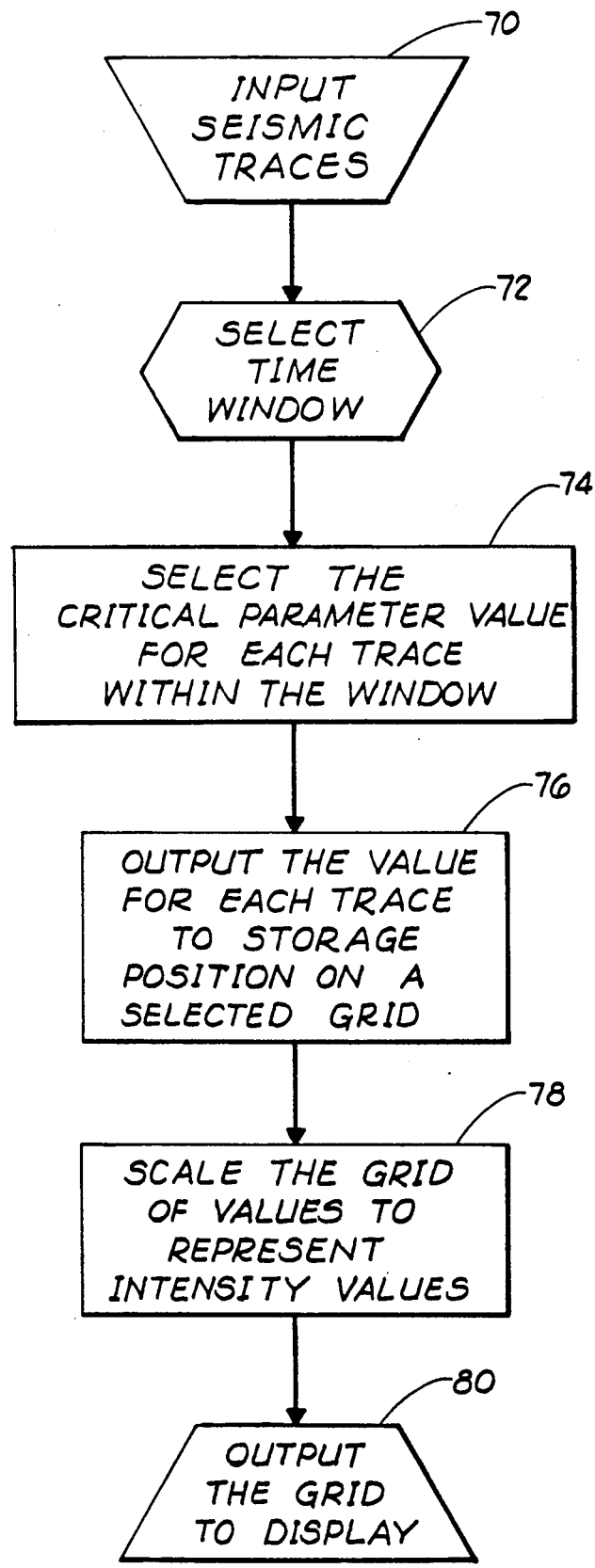
FIG. 2 is a flow diagram of the program implementation for carrying out the method of the present invention.

FIG. 2 illustrates a basic data processing flow diagram which is readily implemented by the skilled artisan to perform the necessary processing and outputing steps to implement the present invention. Present practice utilizes a programmed digital computer, a Model 760 CYBER Digital Computer as is commercially available from Control Data Corporation. And visual output of the display is effected on such as an Applicon Plotter, available from Applicon, Incorporated of Burlington, Mass. Other digital computers and image processing equipment may readily be programmed and utilized to carry out the invention to the similar result. In particular, the $I^2S$ Model 70 Image Process Computer as produced by International Imaging Systems, is particularly effective as it enables a very large range of color hue, value and chroma assignments.

Referring to FIG. 2, the seismic data is input at stage 70 as pre-processed and assembled three-dimensional seismic data for the earth volume of interest. The seismic data input will have been previously examined to select the desired critical parameter; for example, in the example case, previous seismic modeling studies reveal that the amplitude of the trough reflected from the top of the reservoir was related to the amount of pay within the reservoir. A time window is then selected from the known downward travel times in the seismic data, such window being selected to envelope the travel time to the top of the reservoir structure of interest.

Each individual trace of the input 3-D seismic traces is then examined through the time window portion to select a critical parameter value, e.g. the largest, within the window and the value for each trace is output to stage 76 whereupon the time window trace value is stored at a selected grid position that is related to the X-Y coordinates of the earth sector, e.g. a horizontal slice through earth sector 10 at approximately the depth of reservoir area 26. Once the grid is filled for the total cross-section, the grid of values is scaled in some selected manner, i.e, the range of values for the critical parameter as assigned to respective ones of a plurality of color quality values, e.g. intensity, hue or the like, as carried out in stage 78. The scaled grid values are then output to display in stage 80 to reveal a plan view indication of the critical parameter of interest. The operation on the seismic data may be carried out a plurality of times at a plurality of different selected time windows, each selection of which is intended to reveal still more information as to the dip and/or convolution of the oil bearing earth structure. With each different time window, new and different information relative to critical parameter of reservoir top structures will be revealed, and a directionally related pattern soon develops to reveal the essential structure across the entire earth sector that is being examined.

Figure 3:
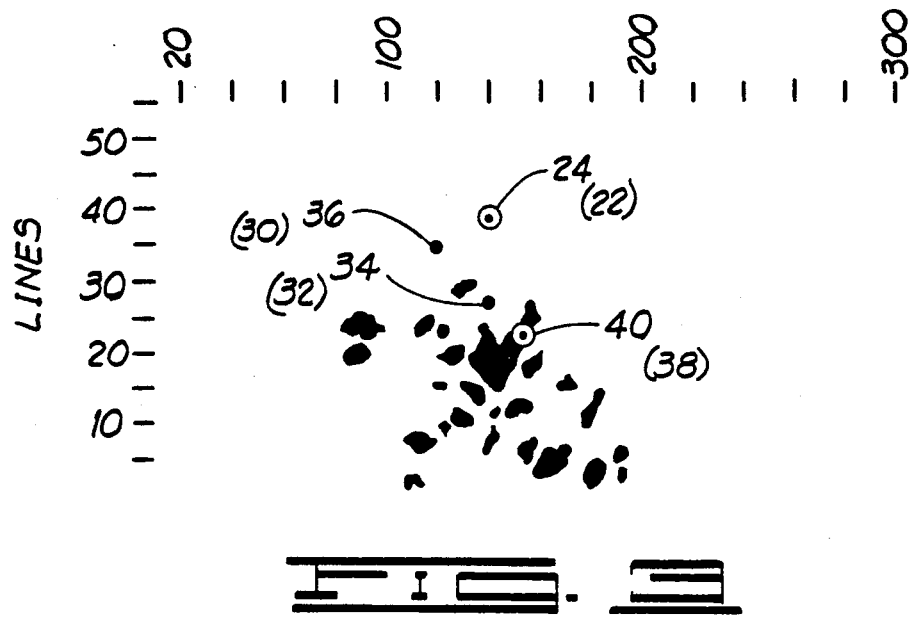
FIG. 3 is an output display of three-dimensional seismic data for a selected time window of the earth volume of FIG. 1.
Figure 4:
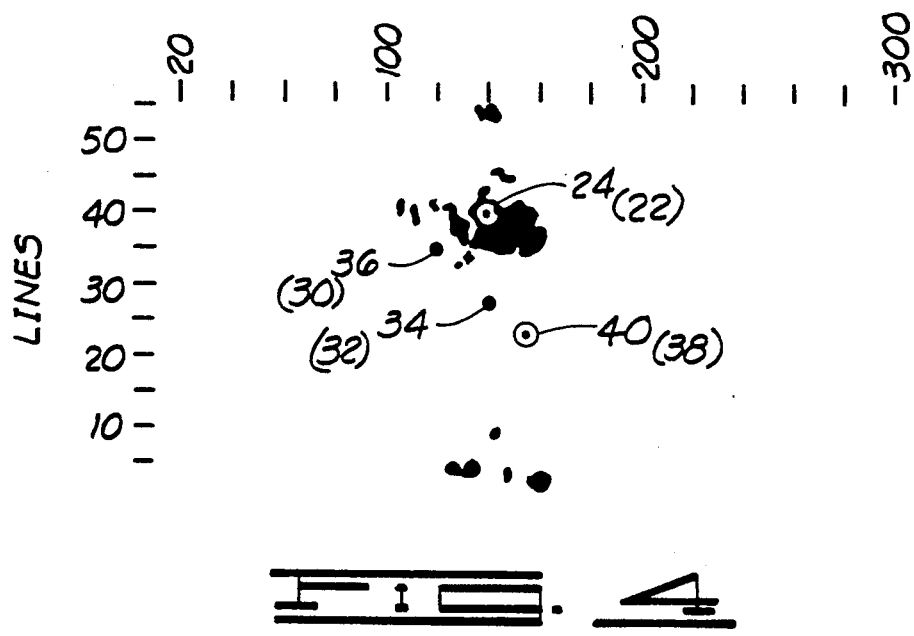
FIG. 4 is an output display of three-dimensional seismic data for a shallower time window through the earth volume of FIG. 1.
Figure 5:
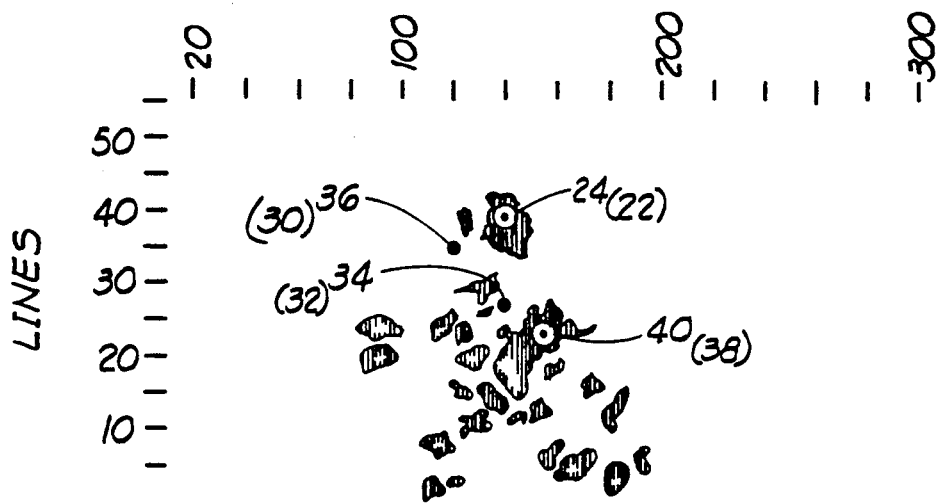
FIG. 5 is a black and white representation of a multi-color display, including gradient color bar, as constructed in accordance with the present invention.
Figure 5:
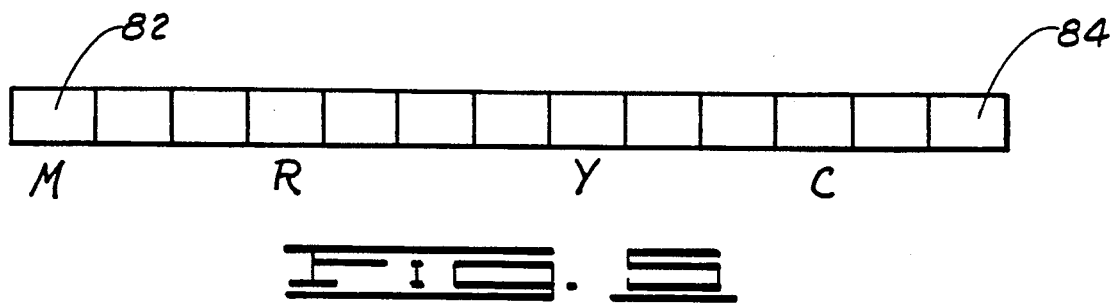

FIGS. 3, 4 and 5 represent actual output displays for the earth sector 10 of FIG. 1. In FIGS. 3 and 4, black and white are reversed for purposes of the depiction. Keep in mind that the original well 22 gave rise to the subsequent examination in accordance with the present invention with a view towards developing the field and drilling additional wells. Previous data inspection showed that the amplitude of the troughs was the critical parameter and 3-D seismic data for the sector was examined in the manner of the invention. An examination of peaks of troughs at a time window extending from 2.175–2.260 seconds depth resulted in a display pattern such as that shown in FIG. 4. It can be readily noted that the original oil well 22 is exactly on indication and that the previously selected dry holes 30 and 32 have indeed missed the reservoir sands. In FIG. 3, a subsequent examination of the 3-D data at a selected time window of 2.268-2.372 seconds depth, i.e. a position deeper than the previous time cut dictated by reservoir area 26, revealed a down-dip of the reservoir as well as a very large and consistent reservoir lower indication. A subsequent drilling of well 38 based on the indication of FIG. 3 proved out in that a good producing oil well was obtained.

FIG. 5 provides a black and white illustration of a multi-color output display of the data similar to that output in black and white in FIGS. 3 and 4. The same 3-D seismic data is utilized and examined over a number of selected time windows bracketing the approximate depth of the top of the reservoir of interest, interface 18 of FIG. 1, and the detected maximum trough values for each time window are scaled on the grid. Output of the grid is then carried out on such as the Applicon Plotter with grid output values ranging from dark magenta at color bar 82 through the red, yellow and cyan hues to a bright color bar white 84. As can be seen from the tonal gradations, there are thirteen different hue/intensity combinations across the color bar and these are effected on the output display in accordance with the scaled value for each individual picture element or pixel. The background of FIG. 5 is dark magenta indicative of low scale values, and the spot indications relating to reservoir top structures shade through reds and greens to white at the highest scale indications.

The foregoing discloses a novel seismic data processing technique wherein three-dimensional data in surround of a producing well can be further examined to isolate attributes and outline hydrocarbon reservoir structure. The method has proven particularly effective in aiding well-site selection in developing oil fields. Proper picking of attributes and subsequent time window examinations of 3-D data can virtually eliminate drilling of dry development wells.

Changes may be made in combination and arrangement of elements as heretofore set forth in the specification and shown in the drawings; it being understood that changes may be made in the embodiments disclosed without departing from the spirit and scope of the invention.

What is claimed is:

1. A method for identifying areal boundaries of a subsurface hydrocarbon reservoir corresponding to a known hydrocarbon producing earth structure comprising:
    (a) obtaining three-dimensional seismic trace data for an earth volume containing a known hydrocarbon producing earth structure and a known non-hydrocarbon producing earth structure;
    (b) identifying a distinctive critical seismic data parameter in the seismic trace data which distinguishes the known hydrocarbon producing earth structure from the known non-hydrocarbon producing earth structure;
    (c) measuring the values of the distinctive critical seismic data parameter appearing within a first selected time window on the individual traces of the seismic trace data;
    (d) storing the values of the respective distinctive critical seismic parameter in a first coordinate grid;
    (e) scaling the first coordinate grid to transform the values of the distinctive critical seismic parameter to respective color quality values in a range of color quality values on a plural color bar;
    (f) measuring the values of the distinctive critical seismic data parameter appearing within a second selected time window on the individual traces of the seismic trace data;
    (g) storing the values of the respective distinctive critical seismic parameter within said second selected time window in a second coordinate grid;
    (h) scaling the second coordinate grid to transform the values of the distinctive critical seismic parameter to respective color quality values in a range of color quality values on a plural color bar; and
    (i) superimposing the color quality values of the first coordinate grid and the second coordinate grid to a display indicator to form a plan view outline of the areal boundaries of the subsurface hydrocarbon reservoir corresponding to the known hydrocarbon producing earth structure.

2. A method according to claim 1 wherein the distinctive critical seismic parameter is the amplitude of the data trough reflected from the top of the reservoir stratum.

* * * * *